March 2, 1965 J. F. SCHAFFNER 3,171,806
FUEL FILTER
Filed July 15, 1960 2 Sheets-Sheet 1

John F. Schaffner
INVENTOR.

BY
Attorneys

March 2, 1965 J. F. SCHAFFNER 3,171,806
FUEL FILTER
Filed July 15, 1960 2 Sheets-Sheet 2
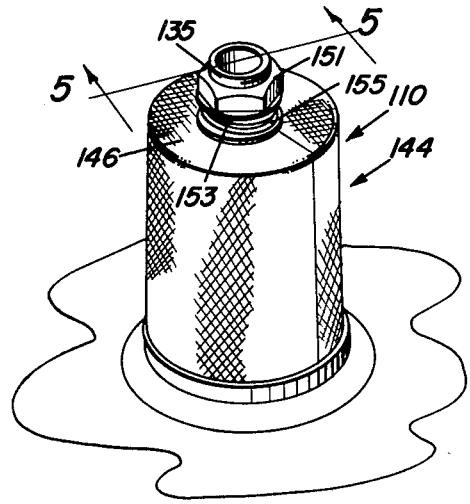
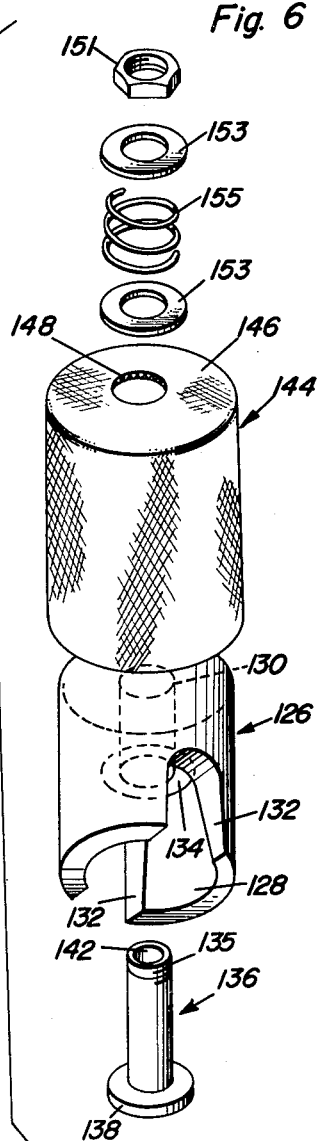
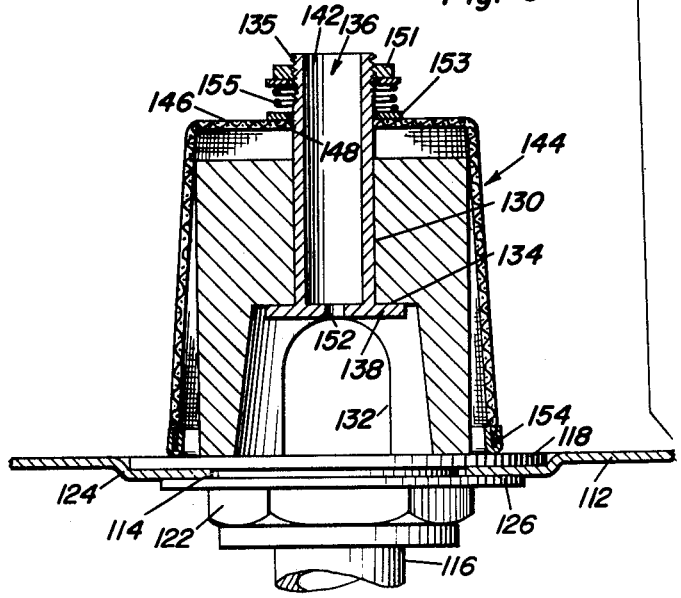
John F. Schaffner
INVENTOR.
BY *Clarence A. O'Brien*
*and Harvey B. Jackson*
Attorneys

United States Patent Office 3,171,806
Patented Mar. 2, 1965

3,171,806
FUEL FILTER
John F. Schaffner, R.F.D. 1, Trempealeau, Wis.
Filed July 15, 1960, Ser. No. 43,050
5 Claims. (Cl. 210—172)

This invention relates to a novel and useful fuel filter, and more specifically to a fuel filter adapted to be positioned within a fuel tank and over the outlet opening of the fuel tank to filter fuel passing therethrough.

Although most combustion engines using liquid fuel are provided with filters in the fuel line either between the fuel tank and the fuel pump or between the fuel pump and the carburetor, most fuel tanks are not provided with fuel filters for preventing foreign material such as paper, seeds, bugs, gravel, etc. from entering the fuel line leading from the fuel tank. In some cases, especially in farm machinery and the like, fuel is quite often pumped into a fuel tank under adverse conditions and from a source of fuel having considerable foreign material therein. When this condition exists, it is quite likely that flexible sheet-like members of foreign material such as paper and/or leaves will find their way to the bottom of the fuel tank and become lodged in overlying relation to the outlet opening of the fuel tank. This of course acts as a constriction in the fuel line and can result in fuel starvation. Additionally, these particles of foreign material can be drawn into the fuel line and from there into the fuel pump causing malfunction of the latter.

Many types of fuel filters for fuel tanks have been heretofore devised but most have merely provided a filter body for placement over the outlet opening of a fuel tank with a screened opening being provided in the body for screening the fuel passing therethrough. This type of fuel filter is sometimes quite sufficient in preventing the entrance of granular foreign material into the fuel line leading from the fuel tank but flexible sheet like members of foreign material can easy become lodged over the screened opening in the filter body and still cause fuel stoppage or fuel reduction to the point where the combustion engine is starved of fuel.

The present invention includes the provision of a fuel filter body having a plurality of spaced openings formed therethrough communicating with the interior of the hollow fuel filter body so that it will be quite unlikely that a single sheet of foreign material may become lodged over all of the inlet openings of the fuel filter body at the same time. In this manner, it is practically assured that fuel stoppage caused by a clogged fuel filter will be eliminated.

The main object of this invention is to provide a fuel filter for disposition within a fuel tank over the outlet opening therein to prevent foreign material within the fuel tank from entering the fuel line leading therefrom.

A further object of this invention, in accordance with the immediately preceding object, is to provide a fuel filter having a plurality of spaced inlet openings therein whereby it will be quite unlikely that a single flexible sheet of foreign material will become lodged over all of the inlet openings of the fuel filter at the same time.

A still further object of this invention is to provide a fuel filter for disposition over the outlet opening of a fuel tank from the interior thereof, which fuel filter may be positioned over the outlet line of the fuel tank by inserting the fuel filter through the inlet opening of the fuel tank and guiding its movement to a position disposed over the outlet opening of the fuel tank.

A still further object of this invention, in accordance with the immediately preceding object, is to provide a fuel filter constructed in a manner whereby the fuel filter may be slid longitudinally along a thin wire-like member in order to facilitate the positioning of the fuel filter over the outlet opening of a fuel tank from the exterior of the fuel tank.

Yet another object of this invention is to provide a fuel filter having a magnetized body whereby no special clamps or fasteners are required to hold the filter in place making it necessary to merely position the fuel filter over the outlet opening of a fuel tank constructed of ferrous material, the magnetic attraction between the body of the filter and the fuel tank being sufficient to retain the fuel filter in proper position relative to the outlet opening of the fuel tank under substantially all conditions.

A further object of this invention is to provide a fuel filter body having a plurality of inlet openings therein and an outlet opening adapted to be positioned directly over the outlet opening of a fuel tank with a screening element being provided completely enclosing the fuel filter body with the exception of the lower surfaces of the body, the lower edges of the filter element being adapted to frictionally engage the surfaces of the fuel tank disposed immediately adjacent the outlet opening thereof.

A further important object of this invention is to provide a filter element surrounding the filter body and secured thereto in a manner whereby the lower edges of the filter material are normally disposed slightly below the lowermost surface of the filter body and a portion of the resilient filter element will be capable of flexing under slight pressure so as to enable the fuel filter body to be magnetically drawn into contact with the surfaces of the fuel tank disposed immediately adjacent the outlet opening formed in the tank thereby maintaining the lower edges of the resilient filter element in frictional engagement with the fuel tank surfaces surrounding the filter body thereby ensuring that foreign material will be prevented from passing between the confronting surfaces of the resilient filter element and the fuel tank.

A final object to be specifically enumerated herein is to provide a fuel filter which will conform to conventional forms of manufacture, be of simple construction and easy to install so as to provide a device that will be economically feasible, long lasting and readily adaptable to substantially all types of liquid fuel tanks.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a perspective view similar to that of FIGURE 1 but showing a modified form of the fuel filter;

FIGURE 5 is an enlarged vertical sectional view taken substantially upon the plane indicated by the section line 5—5 of FIGURE 4; and FIGURE 6 is an exploded perspective view of the fuel filter illustrated in FIGURE 4.

Figure 1:
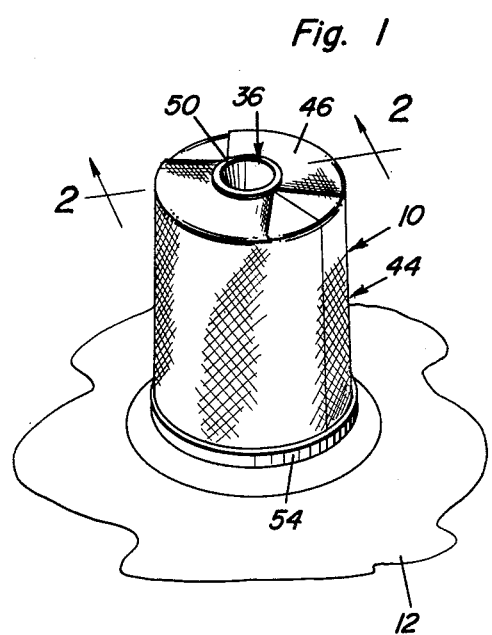
FIGURE 1 is a fragmentary perspective view of the bottom portion of a fuel tank shown with the fuel filter of the instant invention positioned thereover.
Figure 3:
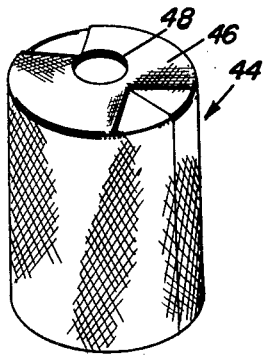
FIGURE 3 is an exploded perspective view of the fuel filter illustrated in FIGURE 1 of the drawings.
Figure 3:
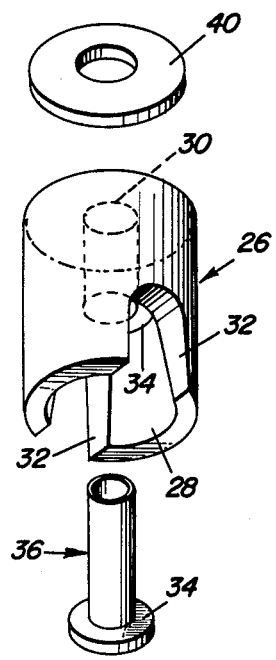
Figure 3:
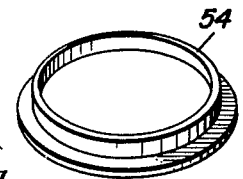
Figure 2:
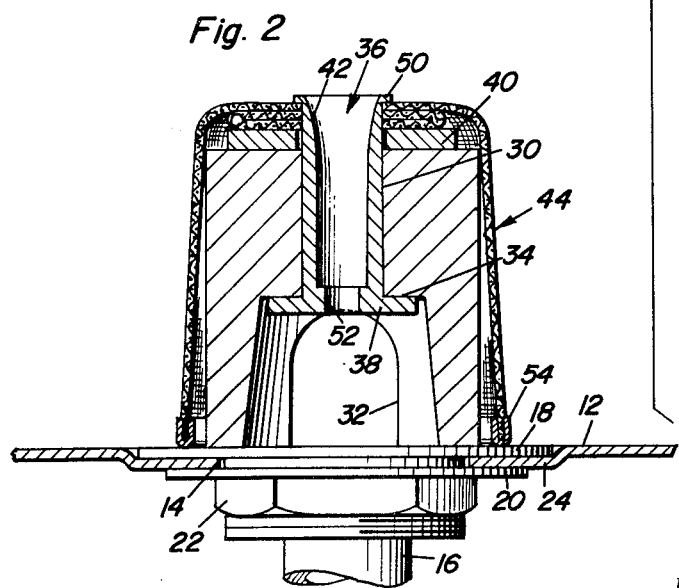
FIGURE 2 is an enlarged vertical sectional view taken substantially upon the plane indicated by the section line 2—2 of FIGURE 1.

Referring now more specifically to the drawings and to FIGURES 1 through 3 in particular, one form of the fuel filter is generally designated by the reference numeral 10. The fuel filter 10 is shown positioned on the bottom wall 12 of a fuel tank having an outlet opening 14 formed therein. An outlet fuel line 16 has one end secured in the outlet opening by means of retaining washers 18 and 20 and a retaining nut 22. The retaining washer 18 is seated within a recess 24 surrounding the opening 14.

The fuel filter 10 includes a generally cylindrical hollow filter body member generally referred to by the reference numeral 26 having a lower opening 28 formed in the bottom thereof communicating with the interior of the body 26. The outlet opening 28 is to be aligned, or substantially so, with the outlet opening 14 in the bottom wall 12 of the fuel tank. The body 26 is also provided with an upper opening 30 communicating with the interior of the body and a pair of side openings 32 communicating with the interior of the body. It will be noted that the side openings 32 are disposed diametrically opposite each other and are in communication with the lower opening 28. It is to be understood that any number of side openings 32 can be provided as desired. The upper opening 30 is smaller in diameter than the lower opening 28 and a radially extending shoulder 34 is formed at the juncture of the lower and upper openings 28 and 30.

A headed fastener generally referred to by the reference numeral 36 is disposed through the upper opening 30 and has a diametrically enlarged head portion 38 seated against the shoulder 34. A spacer washer 40 is disposed over the upper end of the fastener extending through the opening 30 and the fastener 36 is provided with a longitudinal passage 42.

A resilient screening filter member generally referred to by the reference numeral 44 is provided and is generally in the shape of a cylindrical member having an apertured upper end wall 46. Although the upper end wall can be separately formed and secured to one end of the cylindrical filter member 44, the upper wall 46 comprises folded and pleated upper end portions of the cylindrical sides of the cylindrical member 44. In this manner, the filter element 44 may be formed of one piece of resilient screening material.

The resilient filter 44 may be formed of screen material constructed of a suitable metal such as copper or brass or of a plastic material. The member 44 is disposed over the body 26 with the upper end of the fastener 36 projecting through the aperture 48 formed in the upper end wall 46. The upper end of the fastener 36 is peened over as at 50 and thereby secures the member 44 to the body 26. It is to be understood that a suitable filtering material may be provided for the passage 42 and seated in the upper enlarged end portion of the passage 42 adjacent the diametrically reduced portion 52 thereof.

The lower edges of the cylindrical member 44 have a sealing gasket 54 secured thereto for tight sealing engagement with the upper surface of the retaining washer 18 disposed about the body 26. Additionally, the lower edges of the sealing washer 54 are normally disposed slightly below the lower surfaces of the body 26 whereby when the lower surfaces of the body 26 are magnetically drawn into contact with the upper surfaces of the retaining washer 18 the sealing washer 54 will be resiliently urged into frictional engagement with the retaining washer 18 by means of the inherent resiliency of the member 44.

With attention now directed more particularly to FIGURES 4 through 6 of the drawings, there will be seen a modified form of the fuel filter generally referred to by the reference numeral 110. The fuel filter 110 is substantially identical in many respects to the fuel filter 10 and these similar portions have been designated reference numerals in the one hundred series corresponding to the identical portions of the fuel filter 10 designated by reference numerals in the tens series. The cylindrical filter member 144 of the filter 110 is provided with a separately formed upper end wall 146 provided with a centrally disposed aperture 148. The upper end wall 146 has its outer peripheral edges secured to the upper edges of the cylindrical member 144 in any convenient manner such as by welding or other similar process.

The fuel filter 110 is not provided with a spacing washer such as washer 40 but is provided with an externally threaded portion 135 on the upper end of the fastener 136. A retaining nut 151 is threadedly engaged with the upper end of the fastener 136 and a pair of abutment washers 153 are disposed between the nut 151 and the upper end wall 146 and have a compression spring 155 disposed therebetween whereby the filter member 144 is normally resiliently urged toward the bottom wall 112 on which the fuel filter 110 is disposed. Thus, the sealing washer 154 is also resiliently urged into frictional engagement with the retaining washer 118.

By having a plurality of fuel inlet openings formed in the fuel filters 10 and 110 which are disposed on opposite sides of the fuel filter, it is very unlikely that all of the fuel inlet openings will become clogged at the same time. Furthermore, the manner in which each of the fuel filter bodies 26 and 126 are secured to the bottom of a fuel tank enable the fuel filters to be removed when it is desired should it become necessary to flush foreign material from the interior of the fuel tank in which they are disposed. When it is desired to flush the fuel tank, the outlet line from the tank can be disconnected from the fuel pump and suitable fluid can be flushed through the tank and the outlet line after the fuel filter disposed therein have been removed and cleaned. After the tank has been cleaned, the fuel filter may then be replaced over the outlet opening in the tank.

It is to be noted that the passages 36 and 136 enable a thin wire-like member to be inserted through the fuel filters 10 and 110. In this manner, one end of a flexible wire-like member may be bent as required and engaged with the outlet opening in the bottom of a fuel tank. Either of the filters 10 and 110 may then be slid down the wire-like member until they are magnetically secured in alignment with the outlet line of the fuel tank whereupon the wire-like member may then be removed from the tank.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A filter for the outlet opening of a fuel tank comprising a hollow body defining an opening in its lower portion adapted to overlie the inner surfaces of said tank about said outlet opening, at least a portion of said body being of magnetic material whereby said body may be magnetically secured over said outlet opening and to the internal surfaces of said tank about said outlet opening, said body having a second opening formed therein with portions of said second opening disposed above the lowermost portions of said body and communicating with the interior of said body, a screen-like filter member constructed of flexible and resilient material and generally inverted cup-shaped in configuration and including an upper end wall loosely telescoped downwardly over said body, means securing a center portion of said upper end wall to the upper portion of said body in vertically elevated position relative to the latter, the lower peripheral edges of said inverted cup-shaped filter member normally positioned slightly below the lowermost portion of said body whereby the resiliency of said filter member, when said body is magnetically drawn into tight frictional engagement with the inner surfaces of said tank, will yieldingly urge the lower peripheral edges of said inverted cup-saped filter member into frictional engagement with the inner surfaces of said tank.

2. A filter for the outlet opening of a fuel tank comprising a hollow body defining an opening in its lower portion adapted to overlie the inner surfaces of said tank about said outlet opening, at least a portion of said body being of magnetic material whereby said body may be magnetically secured over said outlet opening and to the internal surfaces of said tank about said outlet opening, said body having a second opening formed therein with portions of said second opening disposed above the lowermost portions of said body and communicated with the interior of said body, a screen-like filter member generally inverted cup-shaped in configuration and including an upper end wall loosely telescoped downwardly over said body, means securing a central portion of said upper end wall to said body in vertically elevated position above said body with said filter member normally resiliently urged downwardly relative to said body to a position with the lower peripheral edges of said filter member disposed slightly below the lowermost portion of said body whereby when said body is magnetically drawn into tight frictional engagement with the inner surfaces of said tank said lower peripheral edges will be yieldingly urged into frictional engagement with the inner surfaces of said tank surrounding said outlet opening.

3. The combination of claim 2 wherein the last-mentioned means includes a sleeve fastener secured through said upper end wall and the upper portion of said body.

4. The combination of claim 3 wherein said sleeve fastener includes a single internally diametrically reduced portion extending but a short distance axially of said sleeve fastener adapted to slidingly receive a small diameter wire down which said filter may be slid during its positioning over said outlet opening.

5. The combination of claim 3 wherein said sleeve fastener is slidably received through said upper end wall and includes abutment means on its upper end, said last mentioned means including a compression spring disposed about said sleeve fastener and between said abutment and the upper surface of said upper end wall.

References Cited by the Examiner
UNITED STATES PATENTS

| | | | |
|---|---|---|---|
| 868,255 | 10/07 | Disbrow | 210—459 X |
| 1,270,042 | 6/18 | Moisant | 210—315 |
| 1,688,630 | 10/28 | Mueller | 210—497 |
| 1,941,022 | 12/33 | Shelley | 29—468 |
| 2,047,266 | 7/36 | Hill | 210—297 X |
| 2,226,496 | 12/40 | Jacocks | 29—468 |
| 2,606,628 | 8/52 | Hasselwander | 210—493 X |
| 2,639,783 | 5/53 | Kovacs | 210—437 X |
| 2,692,683 | 10/54 | Mason | 210—437 X |
| 2,784,843 | 3/57 | Braunlich | 210—223 X |
| 3,048,276 | 8/62 | Darnell | 210—437 X |
| 3,061,104 | 10/62 | Schaffner | 210—172 |

HARRY B. THORNTON, *Primary Examiner.*

HERBERT L. MARTIN, *Examiner.*